US008768063B2

(12) United States Patent
Sugita (10) Patent No.: US 8,768,063 B2
(45) Date of Patent: Jul. 1, 2014

(54) IMAGE PROCESSING APPARATUS, IMAGE MANAGEMENT APPARATUS AND IMAGE MANAGEMENT METHOD, AND COMPUTER PROGRAM

(75) Inventor: Yusuke Sugita, Tokyo (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 12/641,984

(22) Filed: Dec. 18, 2009

(65) Prior Publication Data

US 2010/0189356 A1 Jul. 29, 2010

(30) Foreign Application Priority Data

Jan. 28, 2009 (JP) .................................. 2009-016865

(51) Int. Cl.
*G06K 9/00* (2006.01)
*G06K 9/62* (2006.01)

(52) U.S. Cl.
USPC ............................ 382/190; 382/118; 382/224

(58) Field of Classification Search
USPC .......... 382/149, 190, 118, 103, 224; 715/823, 715/838
See application file for complete search history.

(56) References Cited

U.S. PATENT DOCUMENTS

| 7,558,408 | B1 * | 7/2009 | Steinberg et al. | 382/118 |
|---|---|---|---|---|
| 7,564,994 | B1 * | 7/2009 | Steinberg et al. | 382/118 |
| 7,587,068 | B1 * | 9/2009 | Steinberg et al. | 382/118 |
| 7,978,936 | B1 * | 7/2011 | Casillas et al. | 382/305 |
| 8,208,732 | B2 * | 6/2012 | Nakamura | 382/190 |
| 2006/0126906 | A1 * | 6/2006 | Sato et al. | 382/118 |
| 2007/0076954 | A1 * | 4/2007 | Terakawa | 382/190 |
| 2008/0122944 | A1 * | 5/2008 | Zhang | 348/222.1 |
| 2008/0232652 | A1 | 9/2008 | Nonaka et al. | |
| 2008/0260255 | A1 | 10/2008 | Fukushima et al. | |
| 2009/0147995 | A1 * | 6/2009 | Sawada et al. | 382/103 |
| 2009/0304289 | A1 * | 12/2009 | Karimoto et al. | 382/224 |

FOREIGN PATENT DOCUMENTS

| JP | 2000-350123 | 12/2000 |
|---|---|---|
| JP | 2001-211421 | 8/2001 |
| JP | 2004-46591 | 2/2004 |
| JP | 2004-236120 | 8/2004 |
| JP | 2004-320487 | 11/2004 |
| JP | 2008-35149 | 2/2008 |
| JP | 2008-78713 | 4/2008 |
| JP | 2008-146191 | 6/2008 |

OTHER PUBLICATIONS

Office Action issued Nov. 16, 2010 in JP Application No. 2009-016865.

* cited by examiner

*Primary Examiner* — Sheela Chawan
(74) *Attorney, Agent, or Firm* — Oblon, Spivak, McClelland, Maier & Neustadt, L.L.P.

(57) ABSTRACT

An image processing apparatus includes: face detection means for detecting a subject face contained in each of images continuously captured by capturing means and extracting attribute information on each detected face; score determination means for determining a score for each of the continuously captured images on the basis of the attribute information on the detected face extracted by the face detection means; and representative image selection means for selecting a representative image from the continuously captured images on the basis of the score determined by the score determination means.

18 Claims, 5 Drawing Sheets

IMAGE PROCESSING APPARATUS, IMAGE MANAGEMENT APPARATUS AND IMAGE MANAGEMENT METHOD, AND COMPUTER PROGRAM

BACKGROUND OF THE INVENTION

1. Field of the Invention

The present invention relates to an image processing apparatus having a continuous capture function and an image management apparatus and an image management method and a computer program that manage a plurality of continuously captured images. In particular, the present invention relates to an image processing apparatus, an image management apparatus and an image management method, and a computer program that select a representative image desired by a user from a plurality of continuously captured images.

More specifically, the present invention relates to an image processing apparatus, an image management apparatus and an image management method, and a computer program that automatically select a representative image from a plurality of continuously captured images. In particular, the present invention relates to an image processing apparatus, an image management apparatus and an image management method, and a computer program that automatically select a representative image from a plurality of continuously captured images of a subject such as a person in accordance with whether the subject is captured well or poorly in the images.

2. Description of the Related Art

Recently, so-called digital cameras are widely used in place of film cameras. The digital cameras capture images with a solid-state imaging element, with its light receiving sections for photoelectric conversion and charge accumulation arranged in a matrix and formed by photodiodes, in contrast to the film cameras in which images are captured using films and photographic plates. Examples of the solid-state imaging element include CCD (Charge Coupled Device) and CMOS (Complementary Metal Oxide Semiconductor) sensors. The CMOS sensors have advantages that they consume less power than the CCD sensors and that they are driven on a single low voltage and are easy to integrate with surrounding circuits.

Camerawork for the film cameras and camerawork for the digital cameras are basically the same as each other. Along with digitalization of captured images, technologies for automating or assisting camerawork such as automatic exposure control, automatic focus control, and hand-shake correction have been developed, reducing the possibility to fail in capturing to be extremely low even for users unskilled in operating cameras.

Continuous capture may be mentioned as one way for users to capture desired images. In the continuous capture, an identical subject is captured continuously a plurality of times. The continuous capture is especially effective in the case where the subject is a moving object such as a person, for example, because it is difficult for the user to timely press a shutter button. However, the continuous capture incurs a problem that it is necessary to select which images to keep and which images to discard from a plurality of continuously captured images. Well captured images and poorly captured images are mixed in the continuously captured images, and if the images are not selected appropriately as to which to keep and which to discard, the well captured images may be lost, making searches troublesome. In addition, the poorly captured images are basically not necessary and may consume storage space wastefully if the poorly captured images are left undeleted. Hereinafter, an image selected as a well captured image from a plurality of images is referred to as a "representative image".

An image management method in which a plurality of images are extracted in the chronological order from successive images such as a movie file and an index screen in which reduced versions of the plurality of extracted images are arranged in one screen is prepared to store the index screen in a storage device in the form of a readable signal, for example, is proposed (see Japanese Unexamined Patent Application Publication No. 2001-211421, for example). The image management method allows a user to manually select a representative image from the successive images on the index screen. However, it is troublesome and time-consuming for the user to select a representative image for every set of successive images. In addition, the image management method is not intended for continuously captured photographs.

Also, an image output apparatus having a function for classifying image data into groups in accordance with meta data of the image data or attribute information on a person contained in the image data to extract a representative image for each group is proposed (see Japanese Unexamined Patent Application Publication No. 2008-146191, for example). The image output apparatus is configured to allow a user to select the conditions for extracting a representative image from each group. As possible conditions for selecting a representative image, there are mentioned whether the image is a group photograph or a portrait, the resolution level, the focus level, whether the image is a test shot (test-shot images are removed), the capture time interval, the designated capture location, and so forth. However, these extraction conditions are irrelevant to whether the subject is captured well or poorly in the images. Each group of image data classified in accordance with the meta data or the personal attribute information does not necessarily contain continuously captured photographs, which suggests that the image output apparatus is not necessarily intended for continuously captured images.

In addition, a digital camera that selects a representative shot from a plurality of continuous shots on the basis of an AF (Auto Focus) evaluation value obtained by extracting and integrating high-frequency components from image data for the plurality of shots is proposed (see Japanese Unexamined Patent Application Publication No. 2004-320487, for example). However, the digital camera does not select a representative shot in accordance with whether the subject is captured well or poorly in the images, although the digital camera is capable of automatically selecting a clear image from the plurality of shots to store the selected image in a storage device.

SUMMARY OF THE INVENTION

It is therefore desirable to provide an image processing apparatus, an image management apparatus and an image management method, and a computer program that are capable of automatically selecting a representative image desired by a user from a plurality of continuously captured images.

It is further desirable to provide an image processing apparatus, an image management apparatus and an image management method, and a computer program that are capable of automatically selecting a representative image from a plurality of continuously captured images of a subject such as a person in accordance with whether the subject is captured well or poorly in the images.

In view of the foregoing, according to a first embodiment of the present invention, there is provided an image processing apparatus including: face detection means for detecting a subject face contained in each of images continuously captured by capturing means and extracting attribute information on each detected face; score determination means for determining a score for each of the continuously captured images on the basis of the attribute information on the detected face extracted by the face detection means; and representative image selection means for selecting a representative image from the continuously captured images on the basis of the score determined by the score determination means.

According to a second embodiment of the present invention, in the imaging element according to the first embodiment, the face detection means extracts as the attribute information on the detected face a plurality of types of attribute information including at least one of a smiliness degree, an eye closure degree, and an inclination degree of the detected face, and the score determination means calculates a sum of evaluation values of the plurality of types of attribute information to determine the calculated sum as a score for the detected face.

According to a third embodiment of the present invention, in the imaging element according to the second embodiment, for a captured image for which the face detection means detects only one subject face, the score determination means determines the score determined for the detected face as the score for the captured image.

According to a fourth embodiment of the present invention, in the imaging element according to the second embodiment, for a captured image for which the face detection means detects a plurality of subject faces, the score determination means assigns weights to the detected faces and calculates a weighted average of scores determined for the detected faces to determine the calculated weighted average as the score for the captured image.

According to a fifth embodiment of the present invention, the imaging element according to the first embodiment further includes capturing environment information acquisition means for acquiring environment information at the time of capture performed by the capturing means, and for a captured image for which the face detection means detects no subject face, the score determination means determines the score for the captured image on the basis of an evaluation value of the environment information acquired by the capturing environment information acquisition means.

According to a sixth embodiment of the present invention, in the imaging element according to the fifth embodiment, the capturing environment information acquisition means acquires as the capturing environment information at least one of an exposure level at which the capturing means performs capturing, a sharpness level of the image captured by the capturing means, and a hand-shake level at which the capturing means performs capturing.

According to a seventh embodiment of the present invention, the imaging element according to the first embodiment further includes display means, and after the capturing means continuously captures images, the display means displays an index screen showing a list of thumbnails of the continuously captured images.

According to an eighth embodiment of the present invention, the imaging element according to the seventh embodiment further includes image-to-be-deleted determination means for determining an image for which the score determined by the score determination means is a predetermined value or less, of the continuously captured images, as an image to be deleted, and a thumbnail corresponding to the image to be deleted is displayed in an emphasized manner on the index screen.

According to a ninth embodiment of the present invention, there is provided an image management apparatus including: image input means for receiving a plurality of continuously captured images; face detection means for detecting a subject face contained in each of the received continuously captured images and extracting attribute information on each detected face; score determination means for determining a score for each of the continuously captured images on the basis of the attribute information on the detected face extracted by the face detection means; and representative image selection means for selecting a representative image from the continuously captured images on the basis of the score determined by the score determination means.

According to a tenth embodiment of the present invention, there is provided an image management method including the steps of: receiving a plurality of continuously captured images; detecting a subject face contained in each of the received continuously captured images and extracting attribute information on each detected face; determining a score for each of the continuously captured images on the basis of the attribute information on the detected face extracted in the face detection step; and selecting a representative image from the continuously captured images on the basis of the score determined in the score determination step.

According to an eleventh embodiment of the present invention, there is provided a computer program written in a computer-readable form to cause a computer to execute a process for managing a plurality of captured images, the computer program causing the computer to function as: image input means for receiving a plurality of continuously captured images; face detection means for detecting a subject face contained in each of the received continuously captured images and extracting attribute information on each detected face; score determination means for determining a score for each of the continuously captured images on the basis of the attribute information on the detected face extracted by the face detection means; and representative image selection means for selecting a representative image from the continuously captured images on the basis of the score determined by the score determination means.

The eleventh embodiment of the present invention defines a computer program written in a computer-readable form to cause a computer to perform a predetermined process. In other words, installation of the computer program according to the eleventh embodiment of the present invention on a computer allows respective functional elements to cooperate with each other on the computer to obtain the same function and effect as those obtained by the image management apparatus according to the ninth embodiment of the present invention.

According to the present invention, it is possible to provide an imaging element, an image management apparatus and an image management method, and a computer program that are capable of automatically selecting a representative image desired by a user from a plurality of continuously captured images.

According to the present invention, it is also possible to provide an image processing apparatus, an image management apparatus and an image management method, and a computer program that are capable of automatically selecting a representative image from a plurality of continuously captured images of a subject such as a person in accordance with whether the subject is captured well or poorly in the images.

According to the first, ninth, and eleventh embodiments of the present invention, it is possible to automatically evaluate continuously captured images by calculating a score for each of the images on the basis of attribute information on a detected face. It is also possible to automatically select an optimum image from a plurality of captured images as a representative image, saving a user the trouble of selecting a representative image.

According to the second to fourth embodiments of the present invention, it is possible to automatically select a representative image in accordance with whether the subject is captured well or poorly by evaluating the facial expression of a person using parameters such as the smiliness degree, the eye closure degree, and the face inclination degree as the attribute information. Output of an image of a person with good facial expression as a representative image facilitates searches for a photograph of a person with good expression. Also, discrimination of an image of a person with poor facial expression facilitates searches for a photograph to be deleted. According to the fifth and sixth embodiments of the present invention, it is possible to automatically select a representative image, even if no face is contained in continuously captured images, by calculating a score for each of the images on the basis of the capturing environment such as the exposure level and the hand-shake level at the time of capture and the sharpness level of the captured image. According to the sixth and seventh embodiments of the present invention, it is possible to discriminate an image capturing a person with poor facial expression, facilitating searches for a photograph to be deleted via an index screen showing continuously captured images.

Further objects, characteristics, and advantages of the present invention will become apparent upon reading the following detailed description of an embodiment of the present invention given with reference to the accompanying drawings.

DESCRIPTION OF THE PREFERRED EMBODIMENTS

An embodiment of the present invention will be described in detail below with reference to the drawings.

Figure 1:
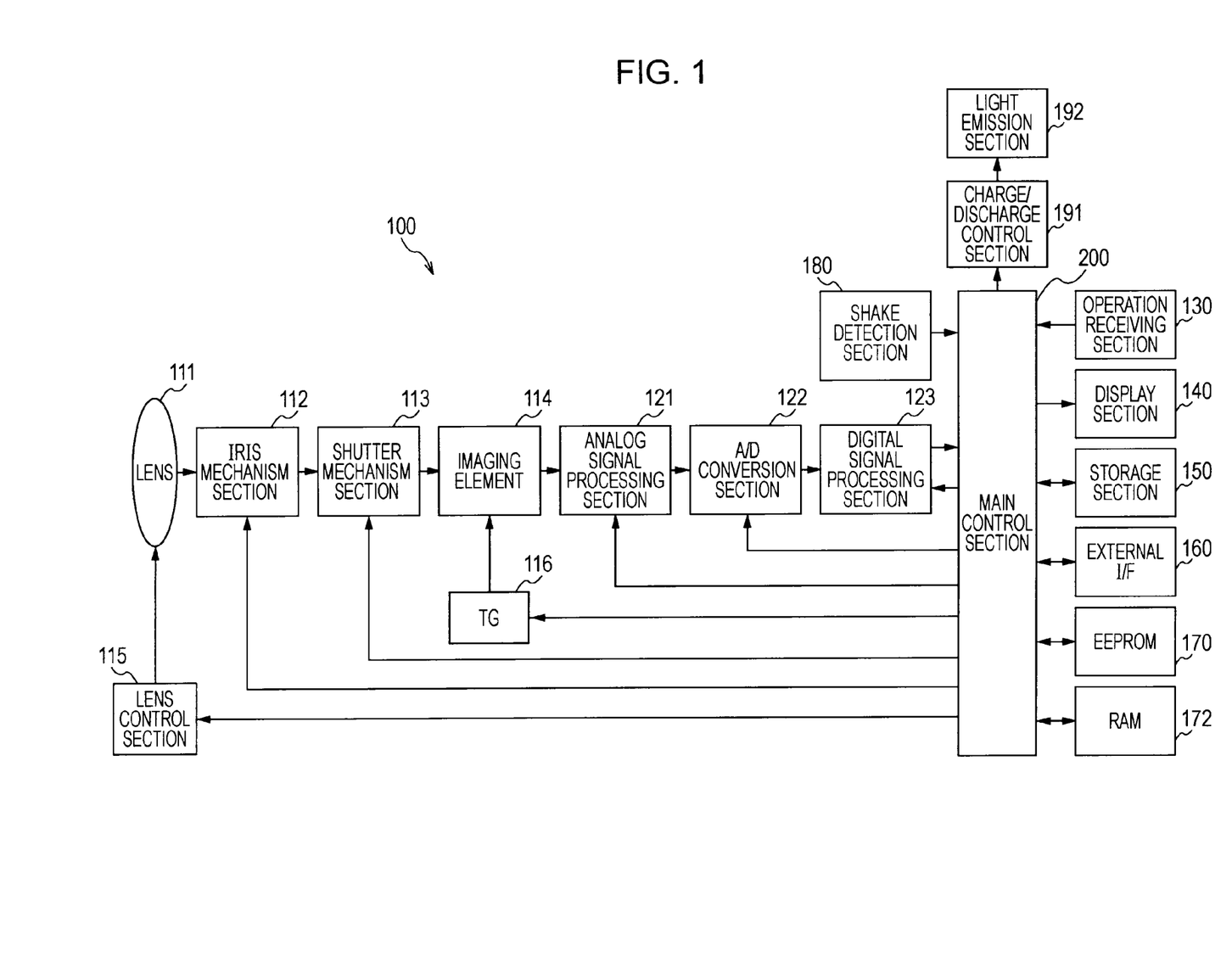
FIG. 1 shows the hardware configuration of an image processing apparatus 100 according to an embodiment of the present invention.

FIG. 1 schematically shows the hardware configuration of an image processing apparatus 100 according to an embodiment of the present invention. As shown, the imaging element 100 includes a lens 111, an iris mechanism section 112, a shutter mechanism section 113, an imaging element 114, a lens control section 115, a TG (timing generator or timing signal generation circuit) 116, an analog signal processing section 121, an A/D conversion section 122, a digital signal processing section 123, a main control section 200, an operation receiving section 130, a shutter release button, a display section 140, a storage section 150, an external interface (I/F) 160, an EEPROM (Electrically Erasable and Programmable Read Only Memory) 171, a RAM (Random Access Memory) 172, a shake detection section 180, a charge/discharge control section 191, and a light emission section 192. The image processing apparatus 100 is configured to serve as a digital still camera capable of capturing a subject to generate image data, analyzing the image data to extract characteristic amounts, and performing various image processes using the extracted characteristic amounts, for example.

The lens 111 includes a plurality of lenses that collect light from the subject such as a zoom lens and a focusing lens. Light incident from the subject is supplied via the lenses to the imaging element 114. The lens 111 is driven by a zoom control mechanism section, a focus control mechanism section, and a shake control mechanism section (none of them are shown). For example, when the zoom control mechanism section and the focus control mechanism section are driven on the basis of a control signal from the main control section 200, zoom control and focus control are respectively performed. In addition, when the main control section 200 determines a position to which a correction optical system should be moved on the basis of shake information on the image processing apparatus 100 detected by the shake detection section 180 and current position information on the correction optical system, the shake control mechanism section is driven on the basis of the determination results to correct shake such as hand-shake.

The iris mechanism section 112 controls the size of an aperture that transmits the light incident via the lens 111 on the basis of a control signal from the main control section 200. The shutter mechanism section 113 controls the time for which the light incident via the lens 111 is transmitted, namely exposure time, on the basis of a control signal from the main control section 200. The control signal for the shutter mechanism section 113 is generated in accordance with an operation for pressing the shutter release button. The amount of light for exposure is thus controlled by the iris mechanism section 112 and the shutter mechanism section 113.

The imaging element 114 is a color imaging element with color filters provided on its imaging surface. The imaging element 114 operates in accordance with driving pulses supplied from the TG 116. An image of the subject is formed on the imaging surface of the imaging element 114 in accordance with the light incident from the subject via the lens 111. Then, the imaging element 114 generates an analog image signal according to the image of the subject formed on the imaging surface, and supplies the generated signal to the analog signal processing section 121. Examples of the imaging element 114 include a CCD sensor and a CMOS sensor.

The lens control section 115 controls the zoom control mechanism section, the focus control mechanism section, and the shake control mechanism section on the basis of a control signal from the main control section 200.

The TG 116 generates various driving pulses necessary for the imaging element 114 to accumulate and read out image signals for each image on the basis of a control signal from the main control section 200, and supplies the generated pulses to the imaging element 114. In other words, the various driving pulses generated by the TG 116 are used as timing signals for an image signal capture process, an image signal output process, and so forth.

The analog signal processing section 121 performs analog processes, such as a sampling (S/H) process and an amplification process through automatic gain control (AGC), on the image signal supplied from the imaging element 114. Then, the A/D conversion section 122 samples an analog image signal supplied from the analog signal processing section 121 at a predetermined sampling rate for conversion into a digital image signal.

The digital signal processing section 123 generates various signals necessary for framing, still image capture, automatic focus control, photometry, and so forth on the basis of a digital image signal supplied from the A/D conversion section 122, and outputs the generated signals to the main control section 200.

For example, during the framing, the digital signal processing section 123 generates a display image signal on the basis of the input image signal, and the display image signal is supplied to the display section 140 via the main control section 200. During the still image capture, when the digital signal processing section 123 generates a still image signal for one image on the basis of the input image signal, the still image signal is subjected to a coding process for compression, for example, and is then supplied to the storage section 150 via the main control section 200. During the automatic focus control, the digital signal processing section 123 detects high-frequency components in a predetermined area of an image on the basis of the input image signal to generate a contrast signal indicating the high-frequency components, that is, the sharpness level. During the photometry, the digital signal processing section 123 detects light-amount components in a predetermined area of an image on the basis of the input image signal to generate an AE signal indicating the light-amount level of the light-quantity components.

The main control section 200 may be formed by a one-chip microcomputer including a CPU (Central Processing Unit), a program ROM, a work area RAM, and various input/output (I/O) ports or interfaces (none of them are shown). The main control section 200 comprehensively controls the various sections of the image processing apparatus 100.

The operation receiving section 130 receives the content of an operation performed by a user, and outputs a signal in accordance with the content of the received operation to the main control section 200. The operation receiving section 130 may be formed by operation members such as a shutter release button and a zoom button (none of them are shown) provided on a main body of the image processing apparatus 100, for example. The shutter release button may be a momentary pressing switch operated by the user to store a captured image, for example. The main control section 200 discriminates three states of the shutter release button, namely an off state in which the shutter release button is not pressed at all by the user, a half pressed state in which the shutter release button is pressed halfway by the user, and a fully pressed state in which the shutter release button is fully pressed by the user. The zoom button is operated to adjust the zoom magnification during capture.

The display section 140 displays an image corresponding to the image data supplied from the digital signal processing section 123, and may be formed by an LCD (Liquid Crystal Display). For example, the display section 140 displays a captured image corresponding to the image signal generated by the imaging element 114 (that is, a through-the-lens image). The display section 140 also displays various operation buttons to serve as a touch panel. This enables the user to input an operation by touching areas of the operation button on the touch panel with his/her fingertip.

The storage section 150 is a storage device that stores the image data supplied from the digital signal processing section 123. The storage section 150 may be a semiconductor memory such as a disk memory card or a removable storage medium such as a DVD (Digital Versatile Disc). The storage section 150 may be built in the image processing apparatus 100 or removably mounted to the image processing apparatus 100.

The external interface (I/F) 160 includes an input/output terminal for connection with external devices such as a USB (Universal Serial Bus) port.

The EEPROM 171 is a memory for storing data that should be held even in a no-power state under control performed by the main control section 200. Examples of this type of data include various setting information for the image processing apparatus 100.

The RAM 172 is a memory for temporarily storing programs and data that are necessary for the main control section 200 to perform various processes.

The shake detection section 180 may include a gyroscope, an acceleration sensor, etc. The shake detection section 180 detects acceleration, motion, rotation, etc., applied to the image processing apparatus 100 to output a voltage value corresponding to the detected value to the main control section 200. For example, the shake detection section 180 acquires voltage values corresponding to the angular speeds of the main body of the image processing apparatus 100 in two directions, namely the pitch direction and the yaw direction. Then, the main control section 200 performs a shake correction computation process on the basis of the voltage values output from the shake detection section 180 for conversion into a value corresponding to the voltage values, acquiring information (shake information) on shake of the main body of the image processing apparatus 100 due to hand-shake of the user, for example.

The light emission section 192 is a light emission device that may be formed by a discharge device such as a xenon lamp, for example, and that is attached to the front surface or the top of a housing of the image processing apparatus 100 to emit light in a forward direction from the lens 111 (the direction of an optical axis of the lens 111). The light emission section 192 irradiates the subject to be captured with a momentary intense flash of light.

The light emission section 192 is connected to the main control section 200 via the charge/discharge control section 191. The light emission timing of the light emission section 192 is controlled by the main control section 200. The charge/discharge control section 191 controls charge and light emission performed by the light emission section 192 on the basis of a control signal from the main control section 200.

The main control section 200 causes the light emission section 192 to preliminarily emit light with a predetermined light amount before main light emission to determine the amount of light to be emitted by the light emission section 192 in the main light emission on the basis of photometric data on the preliminary light emission. That is, the main control section 200 detects a brightness value for the entire image corresponding to the analog image signal output from the imaging element 114 as the photometric data on the preliminary light emission, and compares the detected brightness value and a target brightness value that provides optimum exposure to determine the amount of light to be emitted by the light emission section 192. Therefore, it is not necessary for the imaging element 100 to be provided with a light control sensor.

Figure 2:
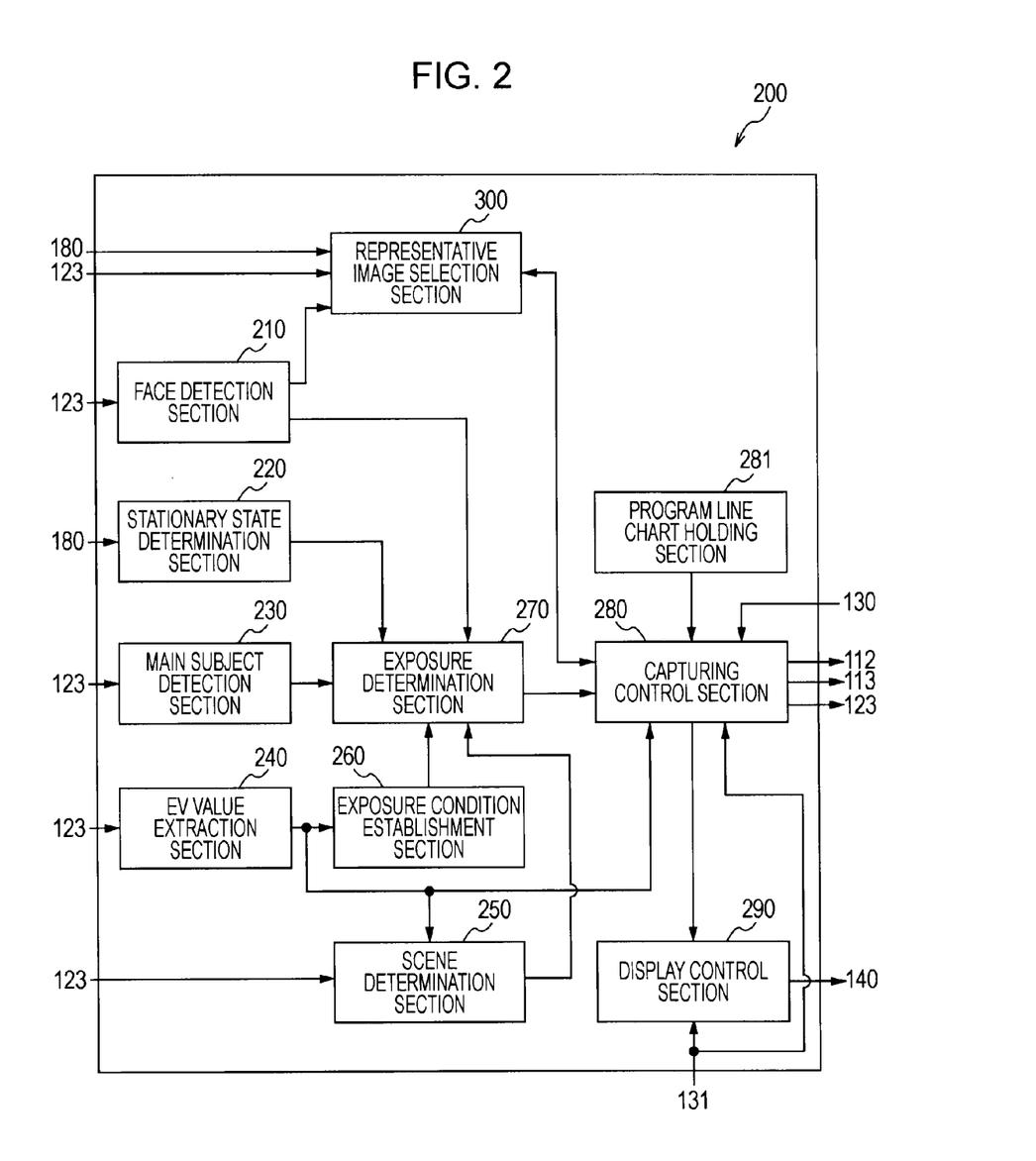
FIG. 2 shows an exemplary functional configuration of a portion of a main control section 200 that mainly performs capture/storage control.

FIG. 2 shows an exemplary functional configuration of a portion of the main control section 200 that mainly performs capture/storage control. The main control section 200 includes a face detection section 210, a stationary state determination section 220, a main subject detection section 230, an EV value extraction section 240, a scene determination section 250, an exposure condition establishment section 260, an exposure determination section 270, a program line chart holding section 281, a capturing control section 280, a display control section 290, and a representative image selection section 300. While each of the functional modules 210 to 300 may be implemented by the main control section 200 executing a corresponding program stored in the EEPROM 171, it is a matter of course that each of the functional modules 210 to 300 may be implemented by dedicated hardware (a processing engine) internal or external to a microprocessor. The face detection section 210, the stationary state determination section 220, the main subject detection section 230, and the scene determination section 250 are controlled independently of each other.

The face detection section 210 detects a face of a person contained in a captured image corresponding to the image signal output from the digital signal processing section 123 to output information on the detected face to the exposure determination section 270. A face may be detected, for example, by matching the actual image with a template storing information on the distribution of brightness of faces or on the basis of skin-color areas or characteristic amounts of human faces contained in the captured image. The information on the face may include, for example, information indicating whether or not a face is detected from the captured image (the presence or absence of a face), the position of the subject and the size of the head (face area), the inclination degree of the head in the yaw direction, and characteristic amounts of the face such as the smiliness degree and the eye closure degree. For details of face detection technologies, see Japanese Unexamined Patent Application Publication No. 2007-249852 and Japanese Unexamined Patent Application Publication No. 2008-305342 which are already assigned to the applicant of the present invention, for example.

The stationary state determination section 220 performs a hand-shake correction computation process on the voltage value output from the shake detection section 180 to calculate a value corresponding to the voltage value (that is, the shake amount of the image processing apparatus 100). The stationary state determination section 220 then calculates a deviation between the calculated shake amount and the shake amount in a stationary state, and determines whether or not the image processing apparatus 100 is stationary on the basis of the calculated deviation and the time to output the determination results (whether or not the image processing apparatus 100 is stationary) to the exposure determination section 270.

The main subject detection section 230 detects a main subject contained in the captured image corresponding to the image signal output from the digital signal processing section 123 to output information on the main subject to the exposure determination section 270. Whether or not the captured image contains a main subject may be detected, for example, by comparing the brightness value of the captured image at the time of the preliminary light emission performed by the light emission section 192 with a predetermined value. An operation for detecting a main subject may be performed in the case where the shutter release button is pressed halfway when it is determined to be in a dark scene in certain darkness or deeper, or in the case where no face is detected when it is determined to be in a night scene or a backlit scene. The information on the main subject may include, for example, information indicating whether or not a main subject is detected from the captured image (the presence or absence of a main subject).

The EV value extraction section 240 detects an EV value, which indicates the brightness of the subject contained in the captured image, on the basis of the AE signal output from the digital signal processing section 123 to output the detected EV value to the scene determination section 250, the exposure condition establishment section 260, and the capturing control section 280.

The scene determination section 250 determines a scene that the subject contained in the captured image corresponding to the image signal output from the digital signal processing section 123 is in, on the basis of the image signal output from the digital signal processing section 123 and the EV value output from the EV value extraction section 240, to output the determined scene to the exposure determination section 270. Examples of the scenes that the subject contained in the captured image may be in include a night scene in which the subject is captured at night in the open air, an indoor scene in which the subject is captured inside a building, and a backlit scene in which the subject is captured against the sun.

The exposure condition establishment section 260 calculates a difference between the EV value output from the EV value extraction section 240 and a predetermined threshold to establish exposure conditions on the basis of the calculated difference. For example, in the case where the EV value output from the EV value extraction section 240 is less than the predetermined threshold, it is considered that exposure is insufficient. Therefore, exposure conditions are so established as to reduce the shutter speed, increase the aperture, or increase the gain in the AGC process. On the other hand, in the case where the EV value output from the EV value extraction section 240 is the predetermined threshold or more, it is considered that exposure is excessive. Therefore, exposure conditions are so established as to increase the shutter speed, reduce the aperture, or reduce the gain in the AGC process. In the embodiment of the present invention, the aperture, the shutter speed, and the gain, of the exposure conditions established by the exposure condition establishment section 260, are respectively referred to as a reference aperture Ie, a reference shutter speed Te, and a reference gain Ge.

The exposure determination section 270 determines whether or not the reference aperture Ie, the reference shutter speed Te, and the reference gain Ge established by the exposure condition establishment section 260 as the exposure conditions are appropriate on the basis of the scene that the subject contained in the captured image is in output from the scene determination section 250, the presence or absence of a face output from the face detection section 210, whether or not the image processing apparatus 100 is stationary output from the stationary state determination section 220, and the presence or absence of a main subject output from the main subject detection section 230. The exposure determination section 270 then selects a program line chart on the basis of the determination results to output information indicating the selected program line chart and the various information on the basis of which the determination has been performed.

The program line chart holding section 281 holds a plurality of program line charts corresponding to respective capture modes that may be set, and supplies the held program line charts to the capturing control section 280. While the program line charts are held in the program line chart holding section 281 of the main control section 200 in the example shown, the program line charts may be held in the EEPROM 171 and be supplied to the capturing control section 280.

The capturing control section 280 changes the program line chart corresponding to the capture mode designated by the user to the program line chart selected by the exposure determination section 270, and determines the exposure conditions on the basis of the EV value output from the EV value extraction section 240. The capturing control section 280 then outputs to the iris mechanism section 112 and the shutter mechanism section 113 a control signal for controlling the iris mechanism section 112 and the shutter mechanism section 113 on the basis of the determined exposure conditions. The capturing control section 280 also sets the capture mode and performs low-illumination correction in accordance with various capture conditions. The capturing control section 280 further performs control to store a captured image using at least two different capture/storage parameters in the case where the shutter release button is fully pressed and it is determined that the subject contained in the captured image is in a particular scene such as a night scene or a backlit scene. In the case where the shutter release button is pressed halfway, at least two different capture/storage parameters are determined. The two different capture/storage parameters may be a capture/storage parameter designated by the user and a capture/storage parameter according to the determined scene, for example.

The display control section 290 causes the display section 140 to display a capture mode recognition icon corresponding to the at least two different capture/storage parameters determined by the capturing control section 280. The display control section 290 also may cause the display section 140 to display an index screen showing a list of thumbnails of groups of images including a plurality of images classified in accordance with the main subject or other capture-related information or a plurality of continuously captured images to be discussed later.

In the embodiment, the image processing apparatus 100 has a continuous capture function for capturing an identical subject a plurality of times. The continuous capture is especially effective in the case where the subject is a moving object such as a person, for example, because it is difficult to timely press the shutter release button. Specifically, when the shutter release button is pressed halfway, the automatic focus control function, the automatic exposure control function, and the main subject detection function are activated. When the shutter release button is fully pressed, normal capture is performed. When the shutter release button is fully pressed continuously for a predetermined period or longer, continuous capture is performed until the shutter release button is released from the fully pressed state.

The continuous capture incurs a problem that it is necessary to select which images to keep and which images to discard from a plurality of continuously captured images. Thus, in the embodiment, the representative image selection section 300 is configured to calculate a score for each of a plurality of continuously captured images on the basis of face information to automatically select an image with the highest score as a representative image of the continuously captured images. The attribute information on a detected face may be used as a parameter for score calculation. Specifically, the representative image selection section 300 may calculate a score for each of the captured images on the basis of the smiliness degree, the eye closure degree, the inclination degree of the detected face output from the face detection section 210.

In the case where no face is found in the continuously captured images, the representative image selection section 300 calculates a score for each image on the basis of environment information at the time of capture in place of face information to automatically select an image with the highest score as a representative image. Examples of the environment information at the time of capture, on the basis of which the representative image selection section 300 calculates a score for each of the captured images, include the exposure level, the sharpness level, and the hand-shake level. The representative image selection section 300 may use as the exposure level and the sharpness level the AE signal indicating the light-quantity level of the light-quantity components and the contrast signal indicating the level of the high-frequency components, both detected from a predetermined area of an image and output from the digital signal processing section 123. The representative image selection section 300 may also use as the hand-shake level the voltage value corresponding to the detection value of the acceleration, motion, and rotation applied to the image processing apparatus 100, output from the shake detection section 180. The representative image selection section 300 receives the capturing environment information to calculate a score for each of the continuously captured images.

This allows the image processing apparatus 100 according to the embodiment to automatically select a representative image from a plurality of continuously captured images in accordance with whether the subject is captured well or poorly, irrespective of whether or not a face is found in the continuously captured images.

After selecting a representative image from a plurality of continuously captured images, the representative image selection section 300 registers the selected representative image in an image management database. The display control section 290 references the image management database, and cause the display section 140 to display an index screen showing a list of thumbnails of groups of images including a plurality of continuously captured images. Details of the screen display will be discussed later.

Figure 3:
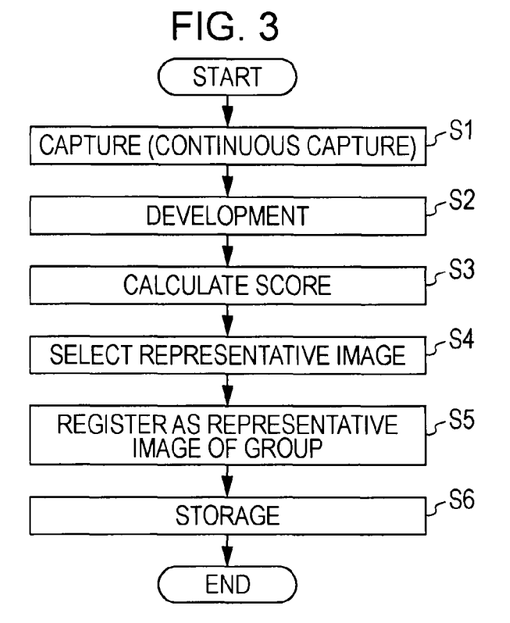
FIG. 3 is a flowchart showing schematic procedures of a representative image selection process.

FIG. 3 is a flowchart showing schematic procedures of a representative image selection process executed by the image processing apparatus 100.

First, the main control section 200 executes a continuous capture process in response to an operation performed on the operation receiving section 130 by the user (step S1).

In a development process, the main control section 200 causes the digital signal processing section 123 to receive image data from the imaging element 114 through the A/D conversion section 122, and to perform signal processing on the image data to produce natural colors (step S2). When the development process is finished, the main control section 200 causes the storage section 150 to temporarily store a plurality of continuously captured images in a medium.

Then, the representative image selection section 300 in the main control section 200 evaluates each of the continuously captured images on the basis of the attribute information on each face detected by the face detection section 210 (in the case where a person is found in the captured image) or the environment information at the time of capture (in the case where no person is found in the captured image) to calculate a score on the basis of the evaluation results (step S3). Examples of the attribute information on a detected face used for evaluation include the smiliness degree, the eye closure degree, and the inclination degree of the detected face, which may be acquired in accordance with a method disclosed in Japanese Unexamined Patent Application Publication No. 2007-249852 or Japanese Unexamined Patent Application Publication No. 2008-305342 (discussed earlier), for example.

Then, the representative image selection section 300 in the main control section 200 selects an image with the highest score, from the images for which score calculation has been performed, as a representative image of the series of continuously captured images (step S4).

Then, the representative image selection section 300 in the main control section 200 stores the image selected as a representative image in the image management database as a representative image (step S5), and updates the image management database stored in the medium using the storage section 150 (step S6).

Figure 4:
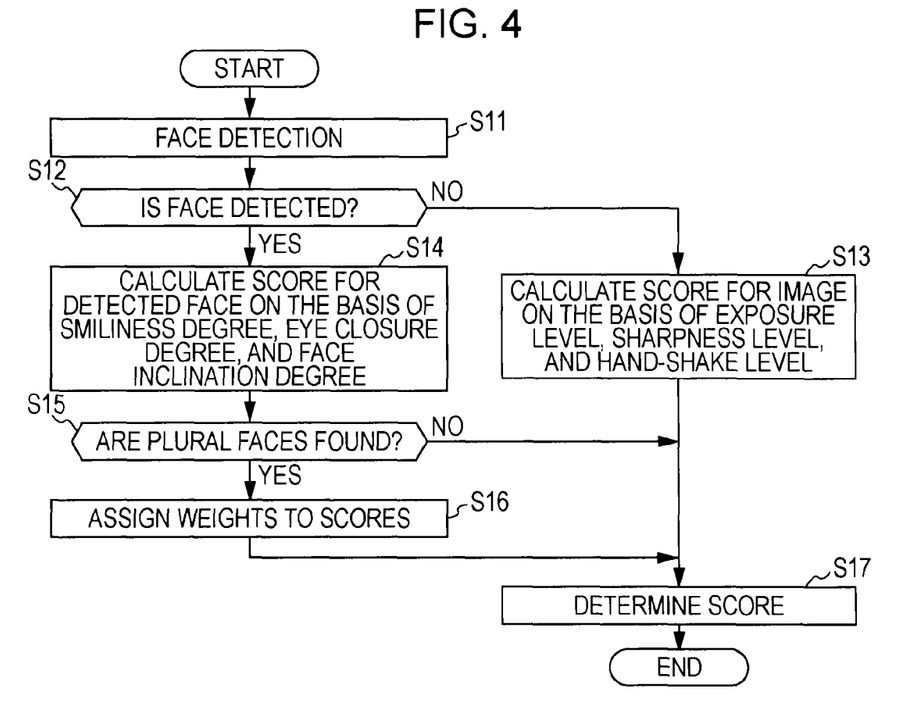
FIG. 4 is a flowchart showing procedures of a process for calculating a score for each of continuously captured images.

FIG. 4 is a flowchart showing procedures of a process for calculating a score for each of continuously captured images executed in step S3 of the flowchart shown in FIG. 3.

First, the face detection section 210 performs face detection on an input image (step S11), and determines whether or not a face is detected (step S12).

In the case where no face is detected from the image (No in step S12), the representative image selection section 300 in the main control section 200 respectively receives the EV value extracted by the EV value extraction section 240, the contrast signal generated by the digital signal processing section 123, and the shake information detected by the shake detection section 180 as the exposure level, the sharpness level, and the hand-shake level forming capturing environment information, and evaluates the image on the basis of the capturing environment information to calculate a score for the image on the basis of the evaluation results (step S13). The representative image selection section 300 then determines and outputs the score for the image (step S17).

On the other hand, in the case where a face is detected from the image (Yes in step S12), the main control section 200 evaluates the detected face on the basis of various face attribute information such as the smiliness degree, the eye closure degree, and the inclination degree of the detected face detected by the face detection section 210, and calculates a score for the image on the basis of the evaluation results (step S14).

Then, it is checked whether the image to be processed contains one face or a plurality of faces (step S15).

In the case where only one face is detected in the image (No in step S15), the score calculated for the detected face is determined as the score for the image (step S17).

In the case where a plurality of faces are detected in the image (Yes in step S15), weights for the respective detected faces are determined to calculate a weighted average of the scores calculated for the respective detected faces (step S16). The calculated weighted average is determined as the score for the image (step S17).

Weights may be assigned to a plurality of detected faces by, for example, assigning a greater weight to a detected face selected by the user on the through-the-lens image or a face for which the boundary of the facial area is distinct (face with a high sharpness level).

FIGS. 5A to 5F show the transition of a screen of the display section 140 during continuous capture.

Figure 5A:
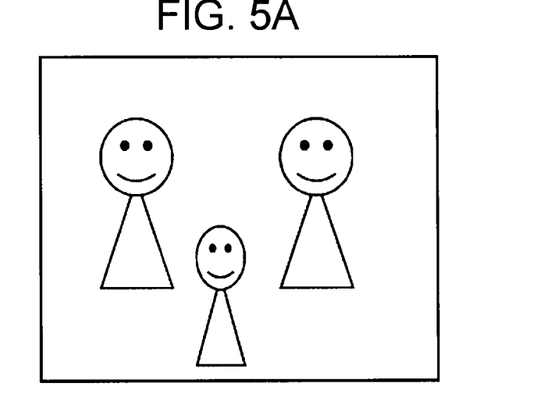
FIG. 5A shows the transition of a screen during continuous capture, specifically showing an exemplary display of a through-the-lens image in a monitoring state.

It is assumed that the through-the-lens image corresponding to the image signal generated by the imaging element 114 in a monitoring state is as shown in FIG. 5A, for example. When the shutter release button is pressed halfway, the automatic focus function, the automatic exposure control function, and the main subject detection function are activated. When an AF (automatic focus) process is locked, frames representing the facial areas of respective detected faces in the through-the-lens image are displayed as shown in FIG. 5B.

When the shutter release button is fully pressed continuously for a predetermined period or longer, continuous capture is performed until the shutter release button is released. Here, it is assumed that ten images are continuously captured.

Figure 5B:
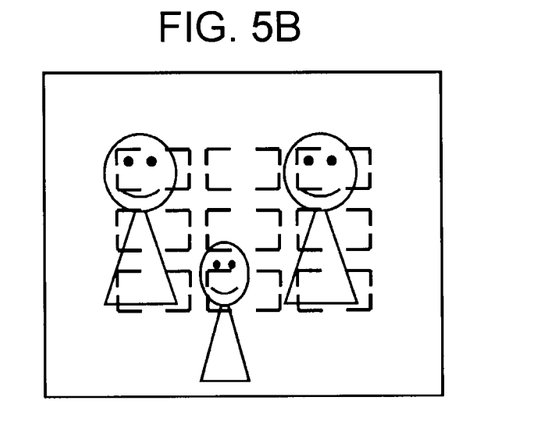
FIG. 5B shows the transition of a screen during continuous capture, specifically showing a state in which detected faces in the through-the-lens image are surrounded by frames with an AF (automatic focus) process locked.
Figure 5C:
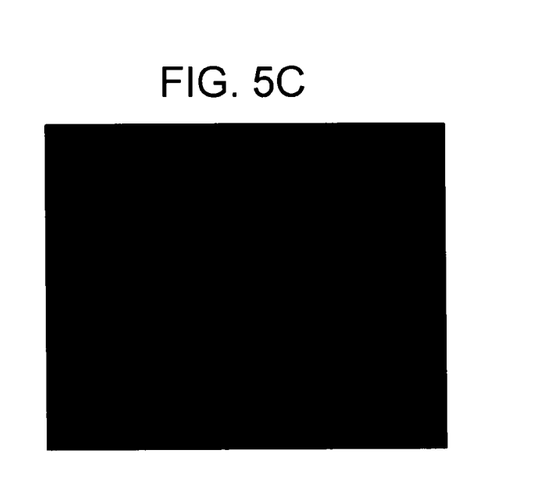
FIG. 5C shows the transition of a screen during continuous capture, specifically showing an exemplary screen configuration at the start of the continuous capture.
Figure 5D:
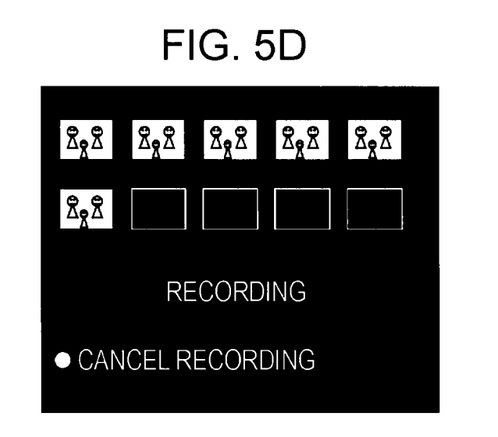
FIG. 5D shows the transition of a screen during continuous capture, specifically showing a display screen during storage or development at the termination or interruption of the continuous capture.

FIG. 5C shows an exemplary screen configuration of the display section 140 during execution of continuous capture, from which the through-the-lens image shown in FIG. 5B has temporarily disappeared. When continuous capture of a predetermined number of images is terminated or the user releases the shutter release button to interrupt storage of continuously captured images, thumbnails of the captured images that have been developed are displayed in a chronological order as shown in FIG. 5D.

The development process and the score calculation process (see FIG. 4) are performed sequentially on the continuously captured images. Then, an image with the highest score is automatically selected as a representative image of the continuously captured images. The image selected as a representative image is stored in the image management database as a representative image (as discussed earlier).

Figure 5E:
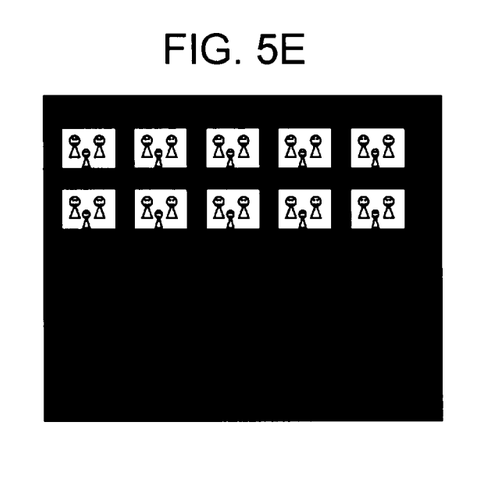
FIG. 5E shows the transition of a screen during continuous capture, specifically showing an exemplary configuration of an index screen showing a list of thumbnails of respective continuously captured images.

When the signal processing is performed on all the captured images, thumbnails of all the continuously captured images are prepared to display an index screen, that is, an automatic review screen, showing a list of the thumbnails as shown in FIG. 5E.

On the index screen showing the thumbnails of the continuously captured images, the user may directly select thumbnails of unnecessary images for deletion. If the user performs no operation on the index screen for a certain period, the display of the index screen is canceled for transition into display of the through-the-lens image as shown in FIG. 5A.

Figure 5F:
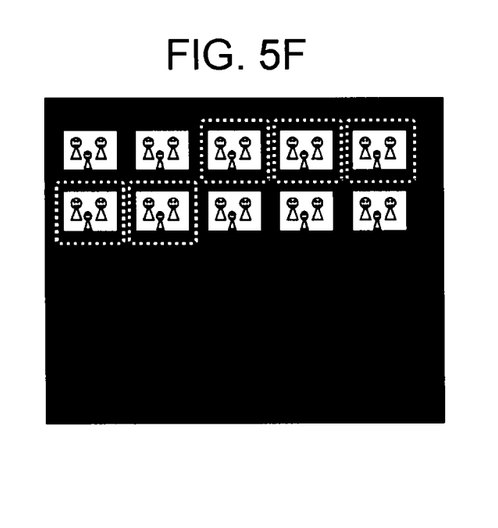
FIG. 5F shows the transition of a screen during continuous capture, specifically showing an exemplary configuration of an index screen prompting a user to delete captured images with a certain score or less.

On the index screen showing the thumbnails of the continuously captured images, thumbnails of images with a certain score or lower (in other words, images in which the subject is captured poorly) may each be surrounded by a frame to be displayed in an emphasized manner as shown in FIG. 5F (in the example shown, such thumbnails are surrounded by dotted lines), prompting the user to delete the images.

The present application contains subject matter related to that disclosed in Japanese Priority Patent Application JP 2009-016865 filed in the Japan Patent Office on Jan. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   face detection means for detecting a subject face contained in each of images continuously captured by capturing means and extracting attribute information on each detected face, the face detection means extracting as the attribute information on the detected face a plurality of types of attribute information including at least one of an eye closure degree and an inclination degree of the detected face;
   score determination means for determining a score for each of the continuously captured images on the basis of the attribute information on the detected face extracted by the face detection means, the score determination means calculating a sum of evaluation values of the plurality of types of attribute information to determine the calculated sum as a score for the detected face; and representative image selection means for selecting a representative image from the continuously captured images on the basis of the score determined by the score determination means.

2. The image processing apparatus according to claim 1, wherein for a captured image for which the face detection means detects only one subject face, the score determination means determines the score determined for the detected face as the score for the captured image.

3. The image processing apparatus according to claim 1, wherein for a captured image for which the face detection means detects a plurality of subject faces, the score determination means assigns weights to the detected faces and calculates a weighted average of scores determined for the detected faces to determine the calculated weighted average as the score for the captured image.

4. The image processing apparatus according to claim 1, further comprising:

capturing environment information acquisition means for acquiring environment information at the time of capture performed by the capturing means, wherein for a captured image for which the face detection means detects no subject face, the score determination means determines the score for the captured image on the basis of an evaluation value of the environment information acquired by the capturing environment information acquisition means.

5. The image processing apparatus according to claim 4, wherein the capturing environment information acquisition means acquires as the capturing environment information at least one of an exposure level at which the capturing means performs capturing, a sharpness level of the image captured by the capturing means, and a hand-shake level at which the capturing means performs capturing.

6. The image processing apparatus according to claim 1, further comprising:

display means, wherein after the capturing means continuously captures images, the display means displays an index screen showing a list of thumbnails of the continuously captured images.

7. The image processing apparatus according to claim 6, further comprising:

image-to-be-deleted determination means for determining an image for which the score determined by the score determination means is a predetermined value or less, of the continuously captured images, as an image to be deleted, wherein a thumbnail corresponding to the image to be deleted is displayed in an emphasized manner on the index screen.

8. An image management apparatus comprising:

image input means for receiving a plurality of continuously captured images;

face detection means for detecting a subject face contained in each of the received continuously captured images and extracting attribute information on each detected face, the face detection means extracting as the attribute information on the detected face a plurality of types of attribute information including at least one of an eye closure degree and an inclination degree of the detected face;

score determination means for determining a score for each of the continuously captured images on the basis of the attribute information on the detected face extracted by the face detection means, the score determination means calculating a sum of evaluation values of the plurality of types of attribute information to determine the calculated sum as a score for the detected face; and representative image selection means for selecting a representative image from the continuously captured images on the basis of the score determined by the score determination means.

9. An image management method comprising the steps of:

receiving a plurality of continuously captured images;

detecting a subject face contained in each of the received continuously captured images and extracting attribute information on each detected face, the detecting including extracting as the attribute information on the detected face a plurality of types of attribute information including at least one of an eye closure degree and an inclination degree of the detected face;

determining a score for each of the continuously captured images on the basis of the attribute information on the detected face extracted in the face detection step, the determining including calculating a sum of evaluation values of the plurality of types of attribute information to determine the calculated sum as a score for the detected face; and selecting a representative image from the continuously captured images on the basis of the score determined in the score determination step.

10. A non-transitory computer readable storage device having a computer program written in a computer-readable form thereon such that when a processor executes the computer program, the computer executes a process, the process comprising:

receiving a plurality of continuously captured images;

detecting a subject face contained in each of the received continuously captured images and extracting attribute information on each detected face, the detecting including extracting as the attribute information on the detected face a plurality of types of attribute information including at least one of an eye closure degree and an inclination degree of the detected face;

determining a score for each of the continuously captured images on the basis of the attribute information on the detected face extracted by the face detection means, the determining including calculating a sum of evaluation values of the plurality of types of attribute information to determine the calculated sum as a score for the detected face; and selecting a representative image from the continuously captured images on the basis of the score determined by the score determination means.

11. An image processing apparatus comprising:

a face detection section configured to detect a subject face contained in each of images continuously captured by a capturing section and extracting attribute information on each detected face, the face detection section configured to extract as the attribute information on the detected face a plurality of types of attribute information including at least one of an eye closure degree and an inclination degree of the detected face;

a score determination section configured to determine a score for each of the continuously captured images on the basis of the attribute information on the detected face extracted by the face detection section, the score determination section configured to calculate a sum of evaluation values of the plurality of types of attribute information to determine the calculated sum as a score for the detected face; and a representative image selection section configured to select a representative image from the continuously captured images on the basis of the score determined by the score determination section.

12. An image management apparatus comprising:

an image input section configured to receive a plurality of continuously captured images;

a face detection section configured to detect a subject face contained in each of the received continuously captured images and extract attribute information on each detected face, the face detection section configured to extract as the attribute information on the detected face a plurality of types of attribute information including at least one of an eye closure degree and an inclination degree of the detected face;

a score determination section configured to determine a score for each of the continuously captured images on the basis of the attribute information on the detected face extracted by the face detection section, the score determination section configured to calculate a sum of evaluation values of the plurality of types of attribute information to determine the calculated sum as a score for the detected face; and a representative image selection section configured to select a representative image from the continuously captured images on the basis of the score determined by the score determination section.

13. A non-transitory computer readable medium having a computer program written in a computer-readable form thereon such that when a computer executes the computer program, the computer manages a plurality of captured images and implements an apparatus comprising:

an image input section configured to receive a plurality of continuously captured images;

a face detection section configured to detect a subject face contained in each of the received continuously captured images and extract attribute information on each detected face, the face detection section configured to extract as the attribute information on the detected face a plurality of types of attribute information including at least one of an eye closure degree and an inclination degree of the detected face;

a score determination section configured to determine a score for each of the continuously captured images on the basis of the attribute information on the detected face extracted by the face detection section, the score determination section configured to calculate a sum of evaluation values of the plurality of types of attribute information to determine the calculated sum as a score for the detected face; and a representative image selection section configured to select a representative image from the continuously captured images on the basis of the score determined by the score determination section.

14. An image processing apparatus comprising:

a face detection unit configured to detect a subject face contained in each of images continuously captured by a capturing unit and extracting attribute information on each detected face, the face detection unit configured to extract as the attribute information on the detected face a plurality of types of attribute information;

a score determination unit configured to determine a score for each of the continuously captured images on the basis of the attribute information on the detected face extracted by the face detection unit, the score determination unit configured to determine a score for the detected face based on evaluation values of the plurality of types of attribute information; and a representative image selection unit configured to select a representative image from the continuously captured images on the basis of the score determined by the score determination unit, wherein the face detection unit is configured to extract the plurality of types of attribute information including at least one of an eye closure degree and an inclination degree of the detected face.

15. The image processing apparatus according to claim 14, wherein the representative image selection unit selects an image from the continuously captured images with a highest score as the representative image.

16. The image processing apparatus according to claim 14, wherein the score determination unit determines the score by adding together a plurality of the evaluation values.

17. The image processing apparatus according to claim 14, wherein the score determination unit determines an evaluation value for each of the plurality of types of attribute information.

18. An image processing method comprising:

detecting a subject face contained in each of images continuously captured by a capturing unit and extracting attribute information on each detected face, the detecting including extracting as the attribute information on the detected face a plurality of types of attribute information;

determining a score for each of the continuously captured images on the basis of the attribute information on the detected face extracted by the detecting, the determining including determining a score for the detected face based on evaluation values of the plurality of types of attribute information, wherein the attribute information includes at least one of an eye closure degree and an inclination degree of the detected face; and selecting a representative image from the continuously captured images on the basis of the score determined by the determining.

* * * * *